(12) United States Patent
Huang et al.

(10) Patent No.: US 10,334,492 B2
(45) Date of Patent: *Jun. 25, 2019

(54) METHOD, APPARATUS AND SYSTEM FOR KEY DERIVATION

(71) Applicant: HUAWEI TECHNOLOGIES CO., LTD., Shenzhen, Guangdong (CN)

(72) Inventors: Min Huang, Shanghai (CN); Jing Chen, Shanghai (CN); Aiqin Zhang, Shanghai (CN); Xiaohan Liu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/601,398

(22) Filed: May 22, 2017

(65) Prior Publication Data

US 2018/0007599 A1    Jan. 4, 2018

Related U.S. Application Data

(63) Continuation of application No. 14/824,342, filed on Aug. 12, 2015, now Pat. No. 9,661,539, which is a
(Continued)

(30) Foreign Application Priority Data

Jun. 23, 2008 (CN) .......................... 2008 1 0067995

(51) Int. Cl.
*H04L 29/06* (2006.01)
*H04W 36/08* (2009.01)
(Continued)

(52) U.S. Cl.
CPC .......... *H04W 36/08* (2013.01); *H04W 12/04* (2013.01); *H04W 36/0038* (2013.01); *H04W 36/0088* (2013.01); *H04W 76/27* (2018.02)

(58) Field of Classification Search
CPC ... H04W 36/08; H04W 12/04; H04W 76/046; H04W 36/0038; H04W 36/0088; H04W 76/27

See application file for complete search history.

(56) References Cited

U.S. PATENT DOCUMENTS 5,224,164 A * 6/1993 Elsner .................. G06Q 20/367
                                                              380/277
7,075,930 B1 * 7/2006 Chen ........................ H04L 29/06
                                                              370/392

(Continued)

FOREIGN PATENT DOCUMENTS

CN        1436414 A       8/2003
CN        1937837 A       3/2007
(Continued)

OTHER PUBLICATIONS

Alcatel-Lucent, Key refresh at Intra-MME handovers, Feb. 2008, 3GPP.*

(Continued)

*Primary Examiner* — David Garcia Cervetti
(74) *Attorney, Agent, or Firm* — Paul Christopher Hashim

(57) ABSTRACT

Method, apparatus and systems are provided for key derivation. A target base station receives multiple keys derived by a source base station, where the keys correspond to cells of the target base station. The target base station selects a key corresponding to the target cell after obtaining information regarding a target cell that a user equipment (UE) is to access. An apparatus for key derivation and a communications system are also provided.

18 Claims, 5 Drawing Sheets

Related U.S. Application Data continuation of application No. 13/667,944, filed on Nov. 2, 2012, now Pat. No. 9,125,116, which is a continuation of application No. 13/197,154, filed on Aug. 3, 2011, now Pat. No. 8,320,568, which is a continuation of application No. 13/073,420, filed on Mar. 28, 2011, now Pat. No. 8,019,083, which is a continuation of application No. 12/942,494, filed on Nov. 9, 2010, now Pat. No. 7,936,880, which is a continuation of application No. PCT/CN2009/072322, filed on Jun. 17, 2009.

(51) Int. Cl.
*H04W 36/00* (2009.01)
*H04W 12/04* (2009.01)
*H04W 76/27* (2018.01)

(56) References Cited

U.S. PATENT DOCUMENTS

| | | | | |
|---|---|---|---|---|
| 7,100,196 B2* | 8/2006 | Fredriksson | G05B 19/042 | 709/208 |
| 7,602,918 B2* | 10/2009 | Mizikovsky | H04L 63/061 | 380/255 |
| 7,738,922 B2* | 6/2010 | Hashimoto | H04W 48/02 | 455/411 |
| 7,936,880 B2* | 5/2011 | Huang | H04W 12/04 | 380/272 |
| 8,019,083 B2* | 9/2011 | Huang | H04W 12/04 | 380/272 |
| 8,068,501 B2* | 11/2011 | Janakiraman | H04L 12/14 | 370/238.1 |
| 8,179,860 B2* | 5/2012 | Brusilovsky | H04L 63/062 | 370/331 |
| 8,208,928 B2* | 6/2012 | Hapsari | H04L 9/083 | 380/44 |
| 8,892,865 B1* | 11/2014 | Roth | G06F 21/602 | 713/150 |
| 9,197,409 B2* | 11/2015 | Roth | H04L 9/083 | |
| 9,232,390 B2* | 1/2016 | Blom | H04J 11/0069 | |
| 9,319,935 B2* | 4/2016 | Fischer | G08C 17/02 | |
| 2002/0154781 A1* | 10/2002 | Sowa | H04L 9/083 | 380/278 |
| 2003/0007172 A1* | 1/2003 | Takayanagi | G06F 21/608 | 358/1.15 |
| 2004/0039910 A1* | 2/2004 | Isokangas | H04W 36/12 | 713/171 |
| 2004/0085360 A1* | 5/2004 | Pratt | G06F 3/0238 | 715/773 |
| 2004/0171399 A1* | 9/2004 | Uchida | H04W 12/02 | 455/514 |
| 2004/0196975 A1* | 10/2004 | Zhu | H04N 7/1675 | 380/258 |
| 2004/0198386 A1* | 10/2004 | Dupray | H04W 64/00 | 455/456.1 |
| 2005/0013277 A1* | 1/2005 | Marque-Pucheu | H04L 9/12 | 370/336 |
| 2005/0025116 A1* | 2/2005 | Chen | H04L 29/06 | 370/349 |
| 2005/0070283 A1* | 3/2005 | Hashimoto | H04W 48/02 | 455/435.1 |
| 2005/0143098 A1* | 6/2005 | Maillard | H04L 67/2847 | 455/456.5 |
| 2005/0159885 A1* | 7/2005 | Nomura | G01C 21/32 | 701/453 |
| 2005/0249142 A1* | 11/2005 | Kim | H04H 20/72 | 370/312 |
| 2006/0078124 A1* | 4/2006 | Whelan | H04L 9/0891 | 380/273 |
| 2007/0003062 A1* | 1/2007 | Mizikovsky | H04L 63/061 | 380/270 |
| 2007/0066298 A1* | 3/2007 | Hurst | H04W 24/00 | 455/423 |
| 2007/0171871 A1* | 7/2007 | Forsberg | H04W 12/04 | 370/331 |
| 2007/0224993 A1* | 9/2007 | Forsberg | H04L 9/0844 | 455/436 |
| 2007/0238464 A1* | 10/2007 | Lim | H04W 36/0055 | 455/436 |
| 2007/0249352 A1* | 10/2007 | Song | H04L 63/08 | 455/436 |
| 2008/0013737 A1* | 1/2008 | Sowa | H04L 9/083 | 380/278 |
| 2008/0045141 A1* | 2/2008 | Suga | H04B 7/15542 | 455/7 |
| 2008/0045148 A1* | 2/2008 | Okuda | H04B 7/15542 | 455/18 |
| 2008/0045270 A1* | 2/2008 | Suga | H04B 7/2606 | 455/561 |
| 2008/0076430 A1* | 3/2008 | Olson | H04W 36/32 | 455/440 |
| 2008/0159542 A1* | 7/2008 | Ito | H04L 9/0894 | 380/279 |
| 2008/0167003 A1* | 7/2008 | Wang | H04W 8/20 | 455/411 |
| 2008/0188200 A1* | 8/2008 | Forsberg | H04W 12/04 | 455/410 |
| 2008/0188221 A1* | 8/2008 | Hashimoto | H04W 48/02 | 455/435.1 |
| 2008/0207227 A1* | 8/2008 | Ren | H04W 68/00 | 455/458 |
| 2008/0240060 A1* | 10/2008 | Janakiraman | H04L 12/14 | 370/338 |
| 2008/0267407 A1* | 10/2008 | Vanderveen | H04L 9/083 | 380/277 |
| 2008/0268844 A1* | 10/2008 | Ma | H04W 36/0033 | 455/436 |
| 2009/0006846 A1* | 1/2009 | Rosenblatt | H04W 12/08 | 713/159 |
| 2009/0011795 A1* | 1/2009 | Fukui | H04J 11/0093 | 455/561 |
| 2009/0061878 A1* | 3/2009 | Fischer | G08C 17/02 | 455/436 |
| 2009/0116642 A1 | 5/2009 | Yang et al. | | |
| 2009/0122763 A1* | 5/2009 | Oguchi | H04W 36/34 | 370/331 |
| 2009/0147951 A1* | 6/2009 | Kuo | H04W 12/04 | 380/44 |
| 2009/0168722 A1* | 7/2009 | Saifullah | H04W 36/0033 | 370/331 |
| 2009/0209259 A1* | 8/2009 | Brusilovsky | H04W 12/04 | 455/438 |
| 2009/0220087 A1* | 9/2009 | Brusilovsky | H04L 63/062 | 380/272 |
| 2009/0227261 A1* | 9/2009 | Tiirola | H04W 16/10 | 455/450 |
| 2009/0252113 A1* | 10/2009 | Take | H04W 36/30 | 370/331 |
| 2010/0002883 A1* | 1/2010 | Sammour | H04L 63/1416 | 380/272 |
| 2010/0048151 A1* | 2/2010 | Hara | H04J 11/0056 | 455/115.1 |
| 2010/0062783 A1* | 3/2010 | Luo | H04J 11/0069 | 455/450 |
| 2010/0069119 A1* | 3/2010 | Mueck | H04J 11/0069 | 455/561 |
| 2010/0144344 A1* | 6/2010 | Jiang | H04Q 3/0045 | 455/433 |
| 2010/0178897 A1* | 7/2010 | Lee | H04W 12/04 | 455/411 |
| 2010/0183153 A1* | 7/2010 | Cho | H04L 45/122 | 380/277 |
| 2010/0189258 A1* | 7/2010 | Kassab | H04L 9/0822 | 380/247 |
| 2010/0202618 A1* | 8/2010 | Yang | H04L 63/068 | 380/277 |
| 2010/0205442 A1* | 8/2010 | Han | H04L 9/0844 | 713/171 |

(56) References Cited

U.S. PATENT DOCUMENTS

| | | | | |
|---|---|---|---|---|
| 2010/0227603 | A1* | 9/2010 | Gupta | H04W 24/02 455/418 |
| 2010/0234016 | A1* | 9/2010 | Palanki | H04W 48/08 455/424 |
| 2010/0234027 | A1* | 9/2010 | Han | H04W 36/00835 455/436 |
| 2010/0267363 | A1* | 10/2010 | Blom | H04J 11/0069 455/410 |
| 2010/0278161 | A1* | 11/2010 | Ore | H04W 36/00835 370/338 |
| 2010/0279696 | A1* | 11/2010 | Voyer | H04W 48/14 455/440 |
| 2010/0305779 | A1* | 12/2010 | Hassan | G01C 17/38 701/2 |
| 2010/0323662 | A1* | 12/2010 | Dahlen | H04W 48/02 455/410 |
| 2011/0044455 | A1 | 2/2011 | Huang et al. | |
| 2011/0091036 | A1* | 4/2011 | Norrman | H04L 9/065 380/44 |
| 2011/0105124 | A1* | 5/2011 | Hapsari | H04L 9/083 455/436 |
| 2011/0116629 | A1* | 5/2011 | Forsberg | H04L 9/083 380/44 |
| 2011/0124358 | A1* | 5/2011 | Iwamura | H04L 9/083 455/507 |
| 2011/0165870 | A1 | 7/2011 | Huang et al. | |
| 2011/0287773 | A1 | 11/2011 | Huang et al. | |
| 2012/0129499 | A1* | 5/2012 | Li | H04L 63/068 455/411 |
| 2012/0157053 | A1* | 6/2012 | Iwamura | H04W 12/04 455/411 |
| 2012/0213203 | A1* | 8/2012 | Jung | H04L 5/001 370/331 |
| 2012/0244865 | A1* | 9/2012 | Iwamura | H04W 12/04 455/437 |
| 2013/0086663 | A1* | 4/2013 | Roth | H04L 9/083 726/7 |
| 2019/0028889 | A1* | 1/2019 | Vanderveen | H04L 9/083 |

FOREIGN PATENT DOCUMENTS

| | | |
|---|---|---|
| CN | 101043328 A | 9/2007 |
| CN | 101193427 A | 6/2008 |
| EP | 2271144 A1 | 1/2011 |
| JP | 1012351 A | 1/1989 |
| KR | 20080018213 A | 2/2008 |
| WO | 2007005309 A1 | 1/2007 |
| WO | 2007110748 A2 | 10/2007 |
| WO | 2008042906 A2 | 4/2008 |
| WO | 2009122260 A2 | 10/2009 |

OTHER PUBLICATIONS

Michel Mouly et al.,"GSM—The System for Mobile Communications", Jan. 1, 1992, GSM System for Mobile Communications, Comprehensive Overview of the European Digital Cellular Systems, Cell & Sys, France, pp. 412-415, 496, XP002188402, ISBN:978-2-9507190-0-3, total 6 pages.

3GPP TS 33.401 V2.0.0, 3rd Generation Partnership Project;Technical Specification Group Services and System Aspects; 3GPP System Architecture Evolution (SAE): Security Architecture;(Release 8), May 2008, total 45 pages.

3GPP TS 36.331 V8.1.0, 3rd Generation Partnership Project; Technical Specification Group Radio Access Network; Evolved Universal Terrestrial Radio Access (E-UTRA) Radio Resource Control (RRC); Protocol specification (Release 8), Mar. 2008, total 122 pages.

3GPP TS 36.300 V8.4.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), Mar. 2008, total 126 pages.

3GPP TS 36.300 V8.3.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), Dec. 2007, total 121 pages.

3GPP TS 33.401 V1.1.0, 3rd Generation Partnership Project;Technical Specification Group Services and System Aspects; 3GPP System Architecture Evolution (SAE): Security Architecture; (Release 8), Apr. 2008, total 1 page.

3GPP TSG SA WG3 (Security)—S3#50 Draft Report, "Draft Report of SA WG3 ad hoc meeting", Secretary of 3GPP TSG-SA WG3, Feb. 25-29, 2008, total 68 pages.

3GPP TS 36.331 V8.0.0, 3rd Generation Partnership Project;Technical Specification Group Radio Access Network; Evolved Universal Terrestrial Radio Access (E-UTRA)Radio Resource Control (RRC); Protocol specification (Release 8), Dec. 2007, total 56 pages.

3GPP TSG SA WG3 Security—S3 SAE/LTE IMS Adhoc, S3-070975,"Re-keying for prepared eNode Bs", Qualcomm Europe, Dec. 11-13, 2007, total 2 pages.

3GPP TSG-RAN WG2 Meeting #61 R2-081369(S3-080182),"LS on Authentication at RRC Connection Re-establishment", RAN WG2, Feb. 11-15, 2008, total 2 pages.

3GPP TR 33.821 V0.8.0, 3rd Generation Partnership Project;Technical Specification Group Services and System Aspects; Rationale and track of security decisions in Long Term Evolved (LTE) RAN / 3GPP System Architecture Evolution (SAE) (Release 8), Apr. 2008, total 125 pages.

3GPP TS 33.401 V8.0.0, 3rd Generation Partnership Project; Technical Specification Group Services and System Aspects; 3GPP System Architecture Evolution (SAE): Security architecture; (Release 8), Jun. 2008, total 45 pages.

3GPP TS 33.abc V1.0.0, 3rd Generation Partnership Project; Technical Specification Group Services and System Aspects; 3GPP System Architecture Evolution: Security Architecture; (Release 8), Feb. 2008, total 34 pages.

3GPP TSG-RAN WG2 meeting #64bis R2-090065, "AS re-keying in case of inter-cell handover", Qualcomm Europe, Jan. 12-16, 2009, total 8 pages.

"Minutes of oral proceedings" to EP Application No. EP09768760. 2—Patent EP 2273818 B1, from EPO, May 26, 2014; with reference E18: "Computer Networks", Third Edition, Andrew S. Tanenbaum,1996 , total 14 pages.

3GPP TSG-RAN WG2 Meeting #58 R2-072382, "Radio Link Failure Recovery", Nokia Siemens Networks et al., Jun. 25-29, 2007, total 8 pages.

3GPP TS 36.300 V8.2.0, 3rd Generation Partnership Project;Technical Specification Group Radio Access Network; Evolved Universal Terrestrial Radio Access (E-UTRA) and Evolved Universal Terrestrial Radio Access Network (E-UTRAN); Overall description; Stage 2 (Release 8), Sep. 2007, total 109 pages.

3GPP TSG SA WG3 Security—S3#50 S3-080058, "KeNB chaining with prepared handovers", Ericsson, Feb. 25-29, 2008, total 9 pages.

3GPP TSG SA WG3 Security—S3#50 S3-080059, "KeNB chaining with prepared handovers pCR to TS 33.abc", Ericsson, Feb. 25-29, 2008, total 2 pages.

3GPP TSG SA WG3 Security—SA3#51 S3-080532, "Reply to Response LS on Authentication at RRC Connection Re-establishment", SA3, Apr. 14-18, 2008, total 3 pages.

3GPP TSG SA WG3 Security—S3#50 S3-080177, "Key derivation for prepared eNode Bs", Qualcomm Europe, Feb. 25-29, 2008, total 1 page.

3GPP TSG-RAN WG2 Meeting #62bis R2-083556, "Security at RRC Connection Re-establishment", Huawei, Jun. 30-Jul. 4, 2008, total 4 pages.

3GPP TSG-RAN WG2 Meeting #63bis R2-085535, "Multiple Cell preparation at Handover", Huawei, Sep. 29-Oct. 3, 2008, total 3 pages.

3GPP TSG-RAN WG2 #63bis Tdoc-R2-085549, "Multiple KeNB* and shortMAC-I forwarding at handover", NTT DOCOMO,Inc. Sep. 29-Oct. 3, 2008, total 5 pages.

(56) References Cited

OTHER PUBLICATIONS

English Translation of Priority Document CN 200810067995.8, total 22 pages.
3GPP TS 36.304 V8.1.0, 3rd Generation Partnership Project;Technical Specification Group Radio Access Network; Evolved Universal Terrestrial Radio Access (E-UTRA); User Equipment (UE) procedures in idle mode (Release 8), Mar. 2008, total 29 pages.
3GPP TS 36.401 V8.2.0, 3rd Generation Partnership Project; Technical Specification Group Radio Access Network; Evolved Universal Terrestrial Radio Access Network (E-UTRAN); Architecture description (Release 8), Jun. 2008, total 18 pages.
Partial Translation of PCT Search Report of PCT/CN2009/072322, dated Sep. 17, 2009, total 14 pages.
3GPP TR 33.821 V0.3.0 (May 2007),3rd Generation Partnership Project;Technical Specification Group Services and System Aspects;Rationale and track of security decisions in Long Term Evolved (LTE) RAN / 3GPP System Architecture Evolution(SAE) (Release 8), total 84 pages.

\* cited by examiner

METHOD, APPARATUS AND SYSTEM FOR KEY DERIVATION

CROSS-REFERENCE TO RELATED APPLICATIONS

This application is a continuation of U.S. patent application Ser. No. 14/824,342, filed on Aug. 12, 2015, now allowed, which is a continuation of U.S. patent application Ser. No. 13/667,944, filed on Nov. 2, 2012, now U.S. Pat. No. 9,125,116, which is a continuation of U.S. patent application Ser. No. 13/197,154, filed on Aug. 3, 2011, now U.S. Pat. No. 8,320,568, which is a continuation of U.S. patent application Ser. No. 13/073,420, filed on Mar. 28, 2011, now U.S. Pat. No. 8,019,083, which is a continuation of U.S. patent application Ser. No. 12/942,494, filed on Nov. 9, 2010, now U.S. Pat. No. 7,936,880, which is a continuation of International Application No. PCT/CN2009/072322, filed on Jun. 17, 2009, which claims priority to Chinese Patent Application No. 200810067995.8, filed on Jun. 23, 2008. All of the afore-mentioned patent applications are hereby incorporated by reference in their entireties.

TECHNICAL FIELD

The present invention relates to the mobile communication field, and in particular, to method, apparatus and system for key derivation.

BACKGROUND

In a long term evolution (LTE) system in the prior art, if a user equipment (UE) in connecting state detects that quality of signal in a source cell is poor, the base station of the source cell (hereinafter referred as source base station) makes the following handover preparations after receiving a measurement report from the UE. The source base station derives a key_A according to a target cell's physical cell identifier (ID), sends the key_A to the base station X of a target cell A (hereinafter referred as target base station), and sends a handover command to the UE. If the UE cannot receive the handover command in case of radio link failure (RLF), the UE re-selects a proper cell and initiates a radio resource control (RRC) connection reestablishment procedure to resume the service.

In the technical solution in the prior art, when the base station of a target cell B that the UE attempts to access through the connection reestablishment procedure is the same as the base station of the target cell A, the UE derives a key_B by using the physical cell ID of the target cell B, and encrypts messages that the UE sends to the base station X by using the key_B; the base station X decrypts the messages sent from the UE by using the key_A according to context information of the UE. Thus, the keys used by the UE and the base station X are inconsistent, which leads to a failure of communication between the UE and the base station.

SUMMARY

Embodiments of the present invention provide a method, an apparatus and a communication system.

According to one aspect of the present invention, a base station functioning as a source base station for a user equipment (UE) is provided. The base station includes: a receiver configured to receive a measurement report from the UE; a processor configured to makes a handover decision and to derive multiple keys corresponding to multiple cells of a target base station for the UE; and a transmitter configured to send a handover request message carrying multiple keys to the target base station for the UE.

According to the other aspect of the present invention, a base station functioning as a target base station for a user equipment (UE) is provided. The base station includes a receiver configured to receive a handover request message from a source base station for the UE and to receive a radio resource control (RRC) connection reestablishment request from the UE. The handover request message carries multiple keys corresponding to multiple cells of the target base station for the UE. The base station further includes a processor configured to select a key from the multiple keys for using in communication with the UE, the selected key corresponding to a target cell that the UE requests to access.

According to another aspect of the present invention, a communication system is provided. The communication system includes a source base station for a User Equipment (UE) and a target base station for the UE. The source base station is configured to receive a measurement report from the UE, to make a handover decision, to derive multiple keys correspond to multiple cells of the target base station, and to send a handover request message carrying the multiple keys to the target base station. The target base station is configured to receive the handover request message from the source base station, to receive a radio resource control (RRC) connection reestablishment request from the UE, and to select a key for using in communication with the UE from the multiple keys, the selected key corresponding to a target cell that the UE requests to access.

In exemplary embodiments of the present invention, the UE and the network apparatus derive keys by using the same key derivation parameters. Thus, the UE and the network apparatus derive the same key, which guarantees normal communication between the UE and the network apparatus, reduces the call drop rate, and brings a better user experience.

DETAILED DESCRIPTION OF ILLUSTRATIVE EMBODIMENTS

The technical solution of the present invention is hereinafter described in detail with reference to the accompanying drawings. It is evident that the embodiments are exemplary only and the present invention is not limited to such embodiments. Other embodiments that those skilled in the art obtain based on embodiments of the present invention also fall in the scope of protection of the present invention.

In the method for key derivation in an exemplary embodiment of the present invention, when the target base station receives at least one key that is derived according to the target base station identifier (ID) and/or target cell's physical cell ID (PCI), upon reception of an RRC connection reestablishment request from a UE, the target base station selects a Key_A and provides the UE with the target base station ID or target cell's physical cell ID used for deriving the Key_A. The selected Key_A may be derived according to the target base station ID, or according to the target cell's physical cell ID corresponding to the cell where the UE is located or according to the physical cell ID carried in the RRC connection reestablishment request. Thus, the key derived by the UE is the consistent with the key determined by the target base station, which guarantees normal communication between the UE and the base station, reduces the call drop rate, and brings a better user experience.

In exemplary embodiments of the method for key derivation, the UE initiates a connection reestablishment procedure, and derives a key according to the target base station ID or target cell's physical cell ID provided by the target base station. Thus, the key derived by the UE is consistent with the key used by the target base station, which guarantees normal communication between the UE and the base station, reduces the call drop rate, and brings a better user experience.

In the prior art, the process of key derivation includes a primary derivation process in which a key KeNB* is derived according to the target cell's physical cell ID and a secondary process in which a key KeNB** is derived according to the KeNB* derived in the primary derivation process. The process of key derivation carried out by the UE and the network apparatus in embodiments of the present invention is the primary derivation process. In the method for key derivation in an embodiment of the present invention, the UE and the network apparatus derive the same KeNB* in the primary derivation process. Thus, the UE and the network apparatus also derive the same KeNB in the secondary derivation process, so that the UE and the network apparatus can maintain normal communications by using the KeNB. It is understandable to those skilled in the art that the method for key derivation described in exemplary embodiments of the present invention can be combined with the method involved in the secondary derivation process in the prior art, a detailed description is omitted here.

Figure 1:
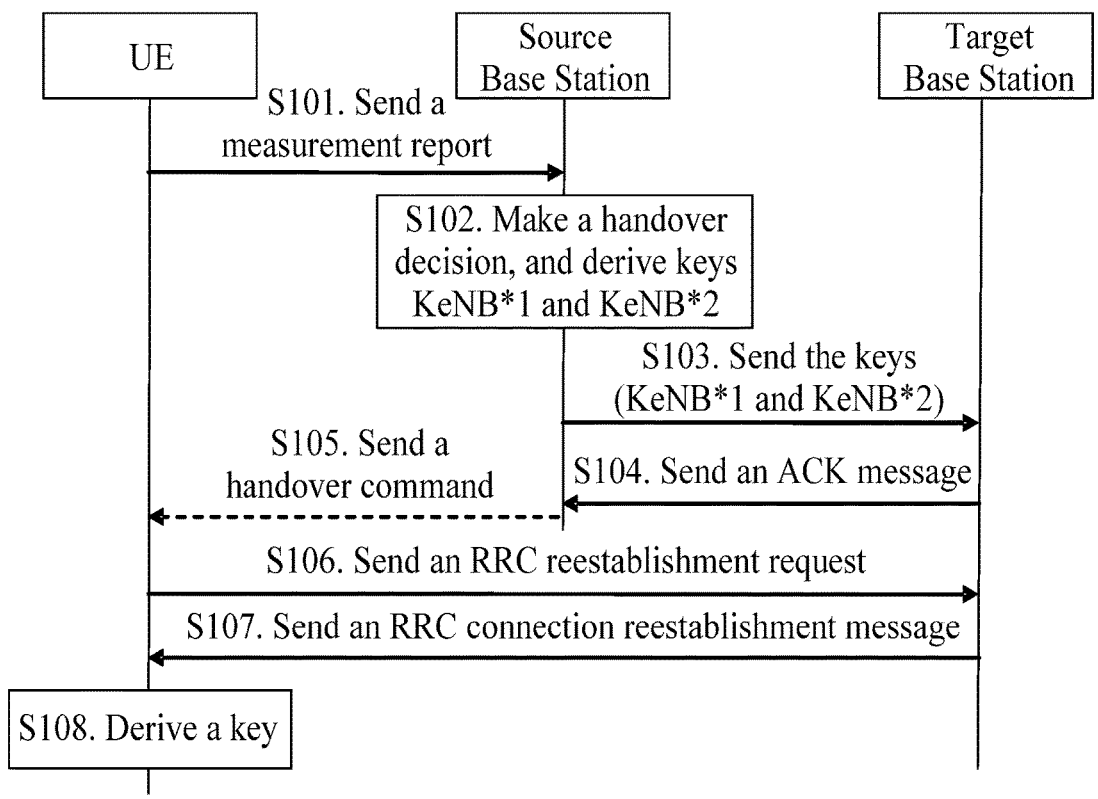
FIG. 1 is a flowchart of a method for key derivation according to a first exemplary embodiment of the present invention.

FIG. 1 is a flowchart of a method for key derivation according to the first exemplary embodiment. As shown in FIG. 1, a source base station is a network apparatus (for example, eNode B) that currently serves a UE, and the target base station is another network apparatus that the source base station selects to serve the UE. The method includes the following steps:

S101. The UE sends a measurement report to the source base station.

S102. The source base station makes a handover decision and derives keys according to the obtained target cell's physical cell ID and the target base station ID respectively.

In this step, it is assumed that the key derived according to the target cell's physical cell ID is KeNB*1 and the key derived according to the target base station ID is KeNB*2.

It is understandable to those skilled in the art that various key derivation algorithms and methods in the prior art are applicable to the key derivation process in this step and are not further described.

S103. The source base station sends the KeNB*1 and KeNB*2 to the target base station.

In this step, the keys may be carried in an access stratum message sent through an X2 interface between the source base station and the target base station. For example, the keys are carried in reserved fields or extended fields in an existing message (for example, a handover request) or a new message. The keys may also be carried in a message sent by an S1 interface between the source base station and a mobility management entity (MME), and the MME provides the received keys for the target base station.

S104. The target base station stores the received key, and sends a handover request Acknowledgement (ACK) message.

S105. The source base station sends a handover command to the UE.

If the UE receives the handover command, the UE executes S106' (not shown in the Figure). That is, the UE derives a key KeNB*1' according to the target cell's physical cell ID. The KeNB*1' is consistent with the KeNB*1 stored in the target base station in terms of derivation algorithms and parameters, and thus the KeNB*1' is consistent with the KeNB*1.

If an Radio Link Failure (RLF) or handover failure occurs, the connection reestablishment procedure initiated by the UE may include the following steps:

S106. The UE sends an RRC connection reestablishment request to the target base station.

S107. If the target base station receives the connection reestablishment request and finds that the key corresponding to the UE is stored in the target base station, the target base station selects the KeNB*2, and sends an RRC connection reestablishment message to the UE.

In this step, the target base station may search for the context information in the target base station according to the UE information so as to find whether the key corresponding to the UE is stored in the target base station. The process of selecting the KeNB*2 by the target base station is a secondary derivation process performed by the target base station according to the KeNB*2. If, after searching for the context information, the target base station finds that the key corresponding to the UE is not stored in the target base station, the target base station may establish a communication with the UE to obtain the context information of the UE and select some of the context information for storing, which does not affect the implementation of the present invention.

S108. The UE receives the RRC connection reestablishment message, and derives a key KeNB*2' according to the obtained target base station ID.

The KeNB*2' in this step is consistent with the KeNB*2 stored in the target base station in terms of derivation algorithms and parameters, and thus the KeNB*2' is consistent with the KeNB*2. The KeNB*2' derived by the UE is used in the secondary derivation process.

In this step, the target base station ID obtained by the UE may come from a system broadcast message. That is, before starting the connection reestablishment procedure or after receiving the RRC connection reestablishment message, the UE reads the target base station ID carried in the system broadcast message. The target base station ID obtained by the UE may also come from the RRC connection reestablishment message. That is, the RRC connection reestablishment message that the target base station sends to the UE in S107 carries a target base station ID, and the UE reads the target base station ID and derives a key in S108, making it unnecessary to read the system broadcast message. In addition, the target base station ID obtained by the UE may come from other messages that the target base station sends to the UE.

It is understandable to those skilled in the art that a cell global identifier (CGI) includes information about the target base station ID. Thus, the message that carries the target base station ID may also be the message that carries the CGI. The receiver reads information about the target base station ID from the CGI, and then uses the target base station ID.

In this embodiment, the source base station sends the two derived keys to the target base station. If the UE succeeds in handover, the UE communicates with the target base station by using the key derived according to the target cell's physical cell ID. When the connection reestablishment procedure is performed in case of an RLF or handover failure of the UE, the UE communicates with the target base station by using the key derived according to the target base station ID. Thus, normal communication between the UE and the network apparatus is guaranteed. The method provided in this embodiment can reduce the call drop rate and bring a better user experience without changing the air interface.

The second exemplary embodiment is similar to the first embodiment except for the following difference: The source base station drives a key according to the obtained target base station ID instead of the target cell's physical cell ID, and sends the derived KeNB*2 to the target base station; the target base station carries a target base station ID in the handover command sent to the UE, so that the UE can derive the KeNB*2' according to the target base station ID after receiving the handover command. Thus, the KeNB*2' is consistent with the KeNB*2. In addition, if the UE initiates a connection reestablishment procedure due to failure to receive the handover command, the target base station carries the target base station ID in the RRC connection reestablishment message sent to the UE or carries the target base station ID in the system broadcast message, so that the UE derives the KeNB*2' according to the target base station ID read from the RRC connection reestablishment message or system broadcast message. Thus, the KeNB*2' is the consistent as the KeNB*2.

In this embodiment, the UE and the network apparatus derive keys by using the target base station ID as the parameter. Thus, the keys derived by the UE and the network apparatus are consistent, which guarantees normal communication between the UE and the network apparatus, reduces the call drop rate, and brings a better user experience.

Figure 2:
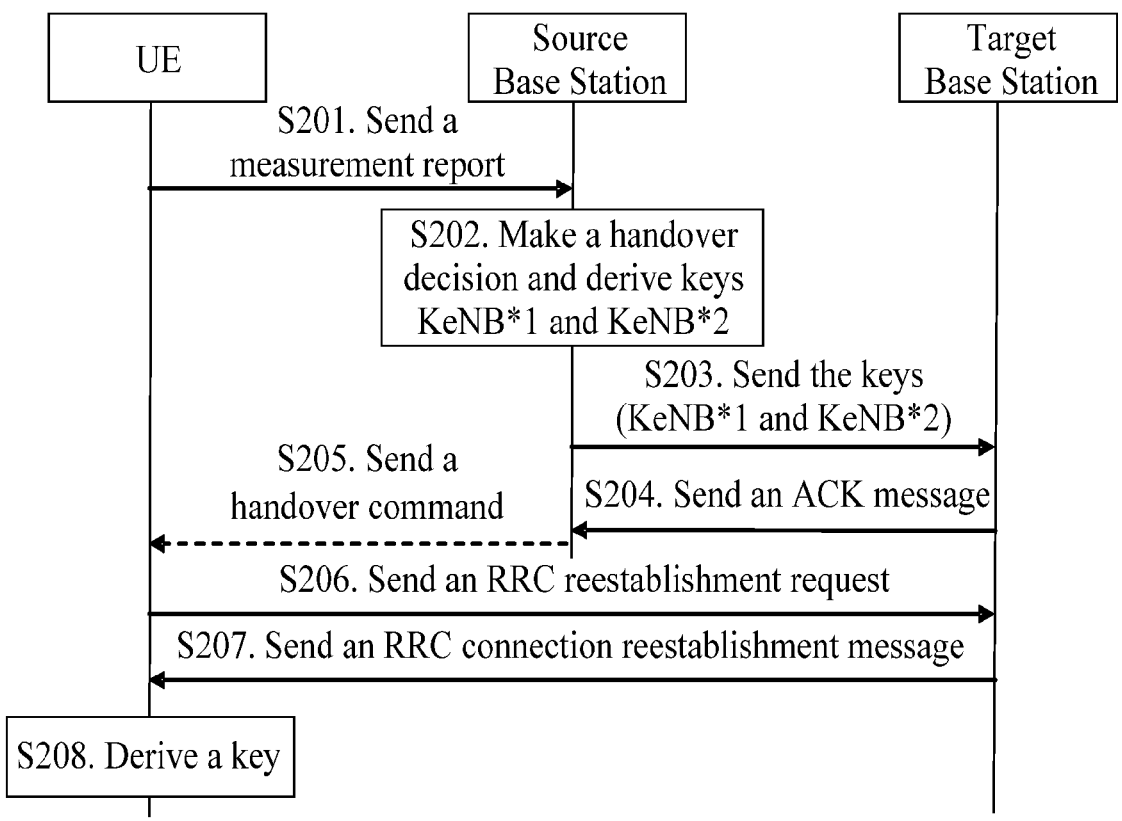
FIG. 2 is a flowchart of a method for key derivation according to a third exemplary embodiment of the present invention.

FIG. 2 is a flowchart of a method for key derivation in the third exemplary embodiment of the present invention. As shown in FIG. 2, the source base station is a network apparatus (for example, source eNodeB) that currently serves the UE, and the target base station is another network apparatus (for example, target eNode B) that the source base station selects to serve the UE. The method includes the following steps:

S201. The UE sends a measurement report to the source base station.

S202. The source base station makes a handover decision, searches for all target cells' physical cell IDs corresponding to the source base station according to the obtained target base station ID, and derives keys according to the target cells' physical cell IDs respectively.

In this step, it is assumed that the target base station has three cells; that is, there are three target cells' physical cell IDs corresponding to the target base station ID, namely, Cell1, Cell2, and Cell3. Thus, three keys are derived, represented by KeNB*1, KeNB*2, and KeNB*3.

It is understandable to those skilled in the art that various key derivation algorithms and methods in the prior art are applicable to the key derivation process in this step and are not further described.

S203. The source base station sends the KeNB*1, KeNB*2 and KeNB*3 to the target base station.

In this step, the keys may be carried in an access stratum message sent through the X2 interface between the source base station and the target base station. The keys may be carried in reserved fields or extended fields in an existing message (for example, a handover request) or a new message. The keys may also be carried in a message sent by the S1 interface between the source base station and the MME, and the MME provides the received keys for the target base station. In addition, the source base station may carry multiple keys in one message for transmission so as to save resources and improve the transmission efficiency. Furthermore, the source base station may also carry multiple keys to different messages for transmission so as to improve the flexibility of transmission.

S204. The target base station stores the received keys, and sends a handover request ACK message.

S205. The source base station sends a handover command to the UE.

If the UE receives the handover command and obtains a target cell's physical cell ID, for example Cell1, the UE executes S206' (not shown in the figure). That is, the UE derives a KeNB*1' according to the Cell1's physical cell ID. The KeNB*1' is consistent with the KeNB*1 in the target base station in terms of derivation algorithms and parameters, and thus the KeNB*1' is consistent with the KeNB*1.

If the UE cannot receive the handover command in case of an RLF, the connection reestablishment procedure initiated by the UE includes the following steps:

S206. The UE sends an RRC connection reestablishment request to the target base station.

S207. The target base station receives the connection reestablishment request, and learns that a physical cell ID of the cell which the UE requests to access is the ID of Cell2 of the target base station. The target base station uses the KeNB*2 corresponding to the Cell2, and sends an RRC connection reestablishment message to the UE.

S208. The UE receives the RRC connection reestablishment message, and derives a KeNB*2' according to the Cell2.

In this step, the KeNB*2' is consistent with the KeNB*2 stored in the target base station in terms of derivation algorithms and parameters, and thus the KeNB*2' is consistent with the KeNB*2.

In this step, the target cell's physical cell ID obtained by the UE may come from a physical layer ID broadcasted in the system or from the RRC connection reestablishment message. The target base station may carry a target cell's physical cell ID in the RRC connection reestablishment message sent to the UE in step S207, and the UE reads the target cell's physical cell ID and derives a key in S208. The target cell's physical cell ID obtained by the UE may also come from other messages that the target base station sends to the UE.

In this embodiment, the source base station sends all the keys derived according to the target cells' physical cell IDs to the target base station, so that the target base station may select a key for being used in communications with the UE according to a cell that the UE wants to access. Thus, the success rate of UE access to new cells is increased and may reach 100%. The source base station may also select some of key(s) and send the key(s) to the target base station according to some conditions; for example, it may only send key(s) derived according to the target cell(s)' physical cell ID(s) of cell(s) with a higher priority. The source base station may also derive key(s) according to some conditions; for example, it may only derive key(s) according to the target cell(s)' physical cell ID(s) of cell(s) with a lower priority and send the derived key(s) to the target base station. Thus, the success rate of UE access is increased and the amount of information transmitted by the source base station is reduced, but the success rate of UE access is smaller than 100%.

In the method provided in the preceding exemplary embodiment of the present invention, if an RLF occurs when the UE accesses a cell a1 of a target base station A, the UE can access a cell a2 of the target base station through the connection reestablishment procedure. It should be noted that the measurement report sent to the source base station by the UE carries information of multiple accessible target base stations. Thus, the key derivation process of the source base station may be specific to multiple cells under control of multiple target base stations. However, during the key transmission, the keys that the source base station sends to the target base station A may include only keys of different cells under control of the target base station A. Thus, the preceding embodiment exemplary of the present invention is also applicable to the process of UE handover between different target base stations.

Figure 3:
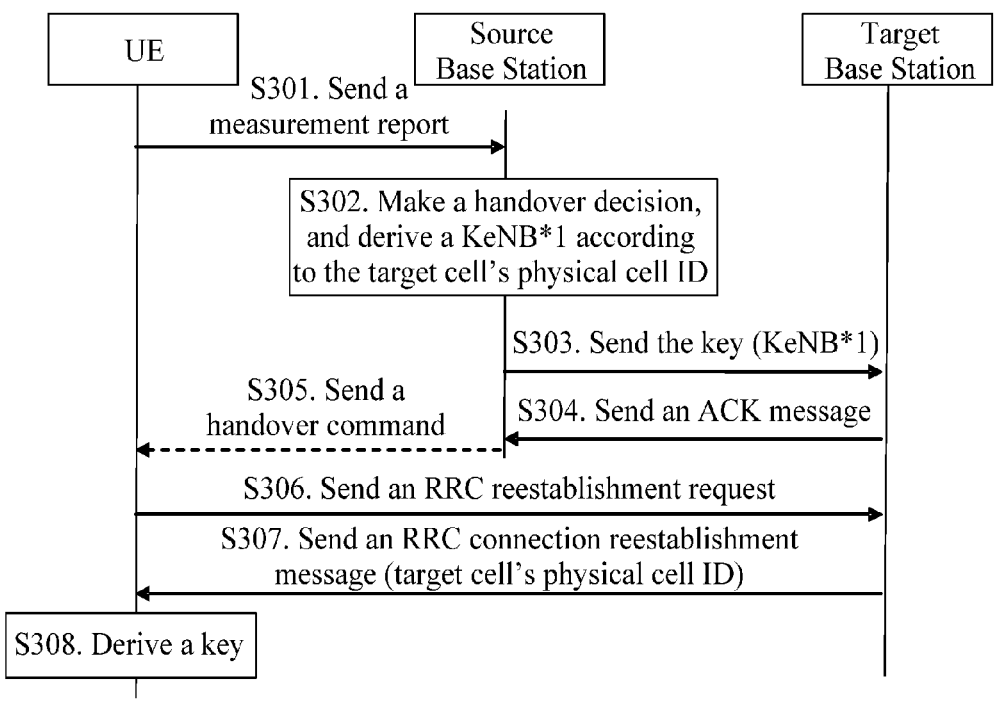
FIG. 3 is a flowchart of a method for key derivation according to a fourth exemplary embodiment of the present invention.

FIG. 3 is a flowchart of a method for key derivation according to the fourth exemplary embodiment of the present invention. As shown in FIG. 3, the source base station is a network apparatus (for example, source eNodeB) that currently serves the UE, and the target base station is another network apparatus (for example, target eNodeB) that the source base station selects to serve the UE. The method includes the following steps:

S301. The UE sends a measurement report to the source base station.

S302. The source base station makes a handover decision, and derives a key according to the obtained target cell's physical cell ID.

In this step, it is assumed that the key derived according to the target cell1's physical cell ID is KeNB*1. Various key derivation algorithms and methods in the prior art are applicable to the key derivation process in this step, and are not further described.

S303. The source base station sends the KeNB*1 to the target base station.

S304. The target base station stores the received key, and sends a handover request ACK message.

S305. The source base station sends a handover command to the UE.

If the UE cannot receive the handover command in case of an RLF, the connection reestablishment procedure initiated by the UE may include the following steps:

S306. The UE sends an RRC connection reestablishment request to the target base station.

S307. After the target base station receives the connection reestablishment request, the target base station sends an RRC connection reestablishment message that carries the Cell1 in the handover request, and derives a KeNB*1 by using the Cell1.

S308. The UE receives the RRC connection reestablishment message, and derives a KeNB*1' by using the Cell1. Thus, the KeNB*1' is consistent with the KeNB*1.

In this embodiment, the target base station may use the key already stored in the target base station without re-deriving a key. The UE derives a key according to the target cell's physical cell ID provided by the target base station. Thus, the keys used by the UE and the network apparatus are the same, which guarantees normal communication between the UE and the network apparatus, reduces the call drop rate, and brings a better user experience.

It is understandable to those skilled in the art that this embodiment is applicable not only to the process of UE handover between different cells under control of the same target base station, but also to the process of UE handover between different target base stations.

In addition, it is understandable to those skilled in the art that the network apparatus and the UE in this embodiment may reach an agreement in advance on one or more of the following aspects: method for key derivation, method for selecting key derivation parameters, and method for sending key derivation parameters. In this case, the network apparatus derives a key according to the agreed method, and sends the needed parameters to the UE, while the UE receives the needed parameters and derives a key according to the agreed method. The network apparatus and the UE may also determine the preceding methods through negotiations. The specific negotiation method does not affect the implementation of the present invention and technical solution, and therefore is not further described.

Figure 4:
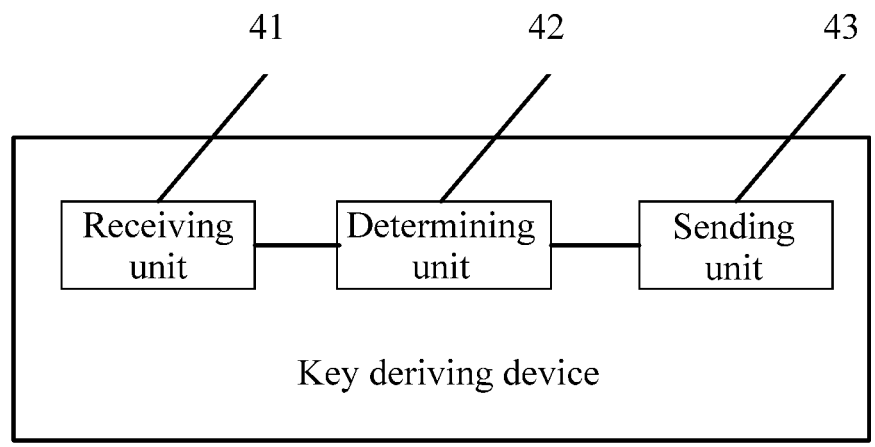
FIG. 4 is a schematic diagram illustrating an apparatus for key derivation according to a fifth exemplary embodiment of the present invention.

FIG. 4 illustrates an apparatus for key derivation according to the fifth embodiment of the present invention. The apparatus includes:

a receiving unit 41, configured to receive at least one key, where the key is derived according to a target base station ID and/or a target cell's physical cell ID;

a determining unit 42, configured to receive an RRC reestablishment request from a UE, and select a Key_A, where the Key_A may be derived according to the target base station ID, or according to the target cell's physical cell ID corresponding to the cell where the UE is located, or be derived according to a physical cell ID carried in the RRC reestablishment request; and a sending unit 43, configured to send the target base station ID or target cell's physical cell ID required for deriving the Key_A.

Figure 5:
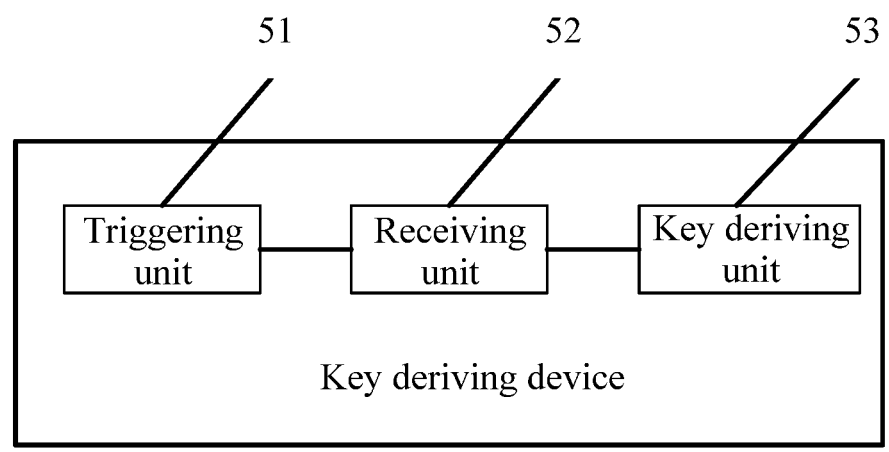
FIG. 5 is a schematic diagram illustrating an apparatus for key derivation in according to sixth exemplary embodiment of the present invention.

FIG. 5 illustrates an apparatus for key derivation according to the sixth exemplary embodiment of the present invention. The apparatus includes:

a triggering unit 51, configured to initiate a connection reestablishment procedure, and trigger a receiving unit 52;

the receiving unit 52, configured to receive the target base station ID and/or target cell's physical cell ID when being triggered by the triggering unit 51; and a key deriving unit 53, configured to derive a key according to the target base station ID or target cell's physical cell ID received by the receiving unit 52.

Figure 6:
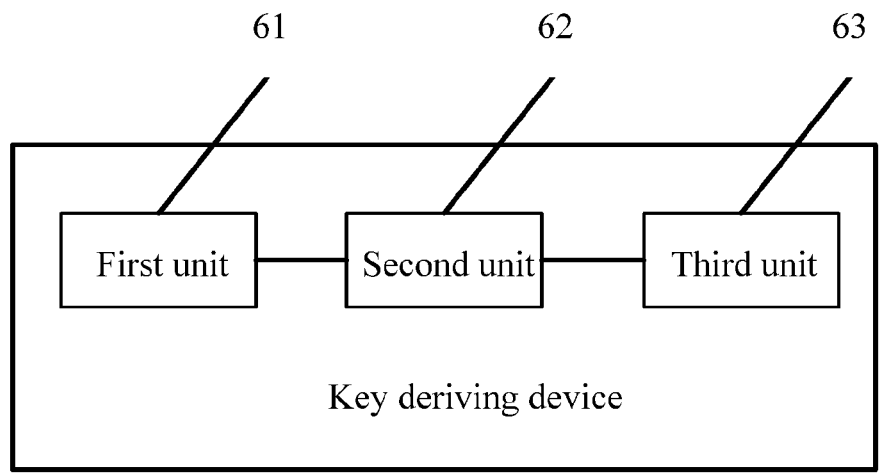
FIG. 6 is a schematic diagram illustrating an apparatus for key derivation according to a seventh exemplary embodiment of the present invention.

FIG. 6 illustrates an apparatus for key derivation according to the seventh exemplary embodiment of the present invention. The apparatus includes a first unit 61 and a second unit 62.

The first unit 61 is configured to receive multiple keys derived by a source base station, where the multiple keys correspond to cells under control of a target base station. The second unit 62 is configured to select a key corresponding to a target cell after knowing the target cell that the UE requests to access. Further, the key corresponding to the target cell that the second unit 62 selects is derived by the source base station according to the target cell's a physical cell ID.

The keys corresponding to the cells under control of the target base station that the first unit 61 receives are derived by the source base station according to cell's physical cell IDs of the target base station. The source base station may send all the keys that are derived according to the target cells' physical cell IDs to the target base station, so that the target base station may select a key for being used in communications with the UE according to the cell that the UE wants to access. Thus, the success rate of UE access to new cells is 100%. The source base station may also select a key and send the key to the target base station according to some conditions; for example, it may only send a key derived according to physical cell ID(s) of target cell(s) with a higher priority. The source base station may also derive a key according to some conditions; for example, it may only derive a key according to physical cell ID(s) of target cell(s) with a low priority, and send the key(s) to the target base station. Thus, the success rate of UE access is increased and the amount of information transmitted by the source base station is reduced, but the success rate of UE access is lower than 100%.

The first unit 61 is further configured to receive an RRC connection reestablishment request from the UE.

The apparatus for key derivation may further include a third unit 63, which is configured to send the target cell's physical cell ID to the UE.

Optionally, the apparatus for key derivation in this embodiment may be a base station.

Figure 7:
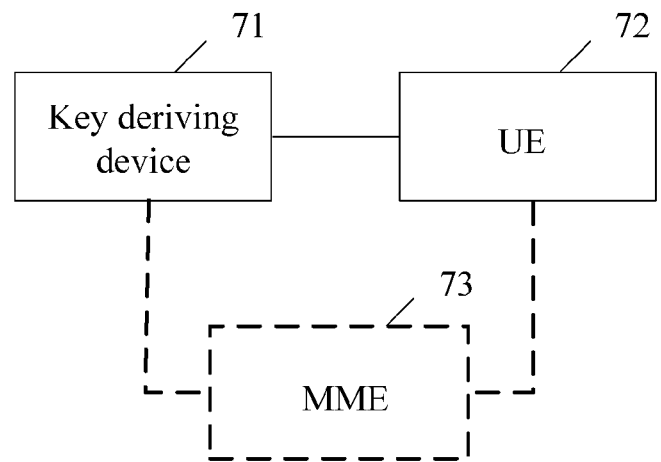
FIG. 7 is a schematic diagram illustrating a communications system according to an eighth exemplary embodiment of the present invention.

FIG. 7 illustrates a communications system according to the eighth exemplary embodiment of the present invention. The communications system includes apparatus 71 for key derivation according to the seventh exemplary embodiment and a UE 72 that communicates with the apparatus 71.

The communications system may further include an MME 73, which is configured to: receive a target cell physical ID that the apparatus 71 sends to the UE, and forward the target cell physical ID to the UE.

Further, the apparatus 71 in the communications system may be used as the target base station of the UE.

The ninth exemplary embodiment of the present invention also provides a communications system. The communications system includes a UE and a network apparatus.

The UE is configured to derive a key according to the received target base station ID or target cell's physical cell ID.

The network apparatus is configured to: select a Key_A from at least one key that is derived according to the target base station ID and/or target cell's physical cell ID according to the received RRC reestablishment request, and send the target base station ID and target cell's physical cell ID used for deriving the Key_A.

The communications system may further include a Mobility Management Entity (MME), which is configured to forward the information about communication between the network apparatus and the UE. The MME forwards the target base station ID or target cell's physical cell ID sent from the network apparatus to the UE.

It is understandable to those skilled in the art that all or part of the steps in the preceding embodiments may be implemented by hardware instructed by a program. The program may be stored in a computer readable storage medium. When the program is executed, the processes of the preceding method embodiments are involved. The preceding storage medium may be a magnetic disk, a compact disk (CD), a read-only memory (ROM), or a random access memory (RAM).

In embodiments of the present invention, the key deriving apparatus and communications system can ensure that the UE and the network apparatus use the same key, which guarantees the normal communication between the UE and the network apparatus, reduces the call drop rate, and brings a better user experience.

Although the invention has been described through several exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the claims or their equivalents.

The invention claimed is:

1. A non-transitory machine-readable medium comprising instructions which, when executed by a machine, cause the machine to perform operations including:
   receiving a measurement report from a user equipment (UE);
   making a handover decision;
   deriving multiple keys corresponding to multiple cells of a target base station for the UE; and
   transmitting a message carrying the multiple keys to the target base station.

2. The medium according to claim 1, wherein the multiple keys are derived according to physical cell identifiers (IDs) of cells of the target base station for the UE.

3. The medium according to claim 2, wherein the multiple keys are derived according to the physical cell IDs of target base station cells having a priority equal to or greater than a predetermined threshold.

4. The medium according to claim 1, wherein the multiple keys are all or part of keys of all cells of the target base station for the UE.

5. The medium according to claim 1, wherein the instructions further cause the machine to perform operations including: receiving a handover request Acknowledgement (ACK) message from the target base station for the UE.

6. The medium according to claim 1, wherein the message is an access stratum message sent through an interface between a source base station and the target base station.

7. The medium according to claim 1, wherein the message is transmitted during handover preparations.

8. The medium according to claim 1, wherein there exists a 1:1 correspondence between the number of keys and the number of cells of the target base station.

9. A non-transitory machine-readable medium comprising instructions which, when executed by a machine, cause the machine to perform operations including:
   receiving a message from a source base station for the UE, the message comprising multiple keys corresponding to multiple cells of a target base station for the UE,
   receiving a radio resource control (RRC) connection reestablishment request from the UE; and
   selecting a key from the multiple keys for using in communication with the UE, the selected key corresponding to a target cell that the UE requests to access.

10. The medium according to claim 9, the instructions further cause the machine to perform operations including: sending a RRC connection reestablishment message to the UE in response to the RRC connection reestablishment request.

11. The medium according to claim 9, the instructions further cause the machine to perform operations including:

sending a handover request Acknowledgement (ACK) message to the source base station for the UE in response to the message.

12. The medium according to claim 9, wherein the multiple keys are derived according to physical cell identifiers (IDs) of the cells of the target base station for the UE.

13. The medium according to claim 12, wherein the multiple keys are derived according to the physical cell IDs of target base station cells having a priority equal to or greater than a predetermined threshold.

14. The medium according to claim 9, wherein the multiple keys are all or part of keys of all cells of the target base station for the UE.

15. The medium according to claim 9, wherein the message is an access stratum message sent through an interface between the source base station and the target base station.

16. The medium according to claim 9, wherein the message is received during handover preparations.

17. The medium according to claim 9, wherein there exists a 1:1 correspondence between the number of keys and the number of cells of the target base station.

18. A non-transitory machine-readable medium comprising instructions which, when executed by a machine, cause the machine to perform operations including:

receiving a measurement report from a user equipment (UE);

making a handover decision;

deriving multiple keys corresponding to multiple cells of a target base station for the UE; and transmitting a message carrying the multiple keys to the target base station, each key of the multiple keys being specific to a corresponding cell of the multiple cells of the target base station.

* * * * *